Feb. 3, 1959  G. G. BUDWIG  2,872,152
VALVE
Filed March 22, 1954

INVENTOR.
GILBERT G. BUDWIG
BY
Lyon & Lyon
ATTORNEYS

United States Patent Office 2,872,152
Patented Feb. 3, 1959

2,872,152

VALVE

Gilbert G. Budwig, North Hollywood, Calif.

Application March 22, 1954, Serial No. 417,632

4 Claims. (Cl. 251—75)

My invention relates to valves, more particularly to sprinkler valves, or valves for the control of spraying devices such as shown in my copending applications, Serial No. 347,961, filed April 10, 1953, now abandoned, and Serial No. 364,835, filed June 29, 1953, now Patent No. 2,744,971.

The objects of my invention are:

First, to provide a valve in which the parts are reduced to a minimum and are particularly inexpensive of manufacture.

Second, to provide a valve which incorporates a novel valve element which by momentary engagement may be moved to closed or to open position, and when so moved tends to remain in such position.

Third, to provide a valve of this class which is particularly suitable for construction in small sizes.

With the above and other objects in view, as may appear hereinafter, reference is directed to the accompanying drawings in which.

Figure 1:
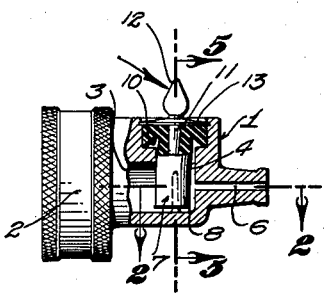
Figure 1 is a partial sectional, partial side view of my valve, shown in its open position.

Reference is first directed to Figs. 1 through 5.

My valve as therein illustrated includes a valve body 1, preferably molded or die cast from metal or plastic. The valve body 1 includes an inlet end 2, which in this case is shown as arranged for attachment to a hose but may be modified for attachment to any desired source of liquid. Continuing inward from the inlet end is an inlet port 3 which intersects a transversely extending valve bore 4, terminating in a counterbore 5 exposed to one side of the valve body.

A discharge port 6 is located diametrically opposite from the inlet port 3. The discharge port 6 is of relatively small diameter as compared to the inlet port 3. In the construction shown, the discharge end of the valve is shown as a nozzle. However, it should be understood that the valve body may form an integral part of or be attached to various devices such as the spraying devices shown in my aforementioned copending applications.

Mounted within the valve body is a valve element 7 formed of rubber or rubber-like material. The valve element 7 comprises a valve cylinder 8 which fits loosely within the valve bore 4 and a flanged end 9 which fits within the counterbore 5. The axially inner side of the flanged end 9 is under cut, as indicated by 10. The valve element 7 is provided with a central bore which receives an operating pin 11. The operating pin 11 protrudes from the valve body 1 and is provided with a rudimentary handle or knob 12. The valve element 7 is retained in place by means of a disk 13, the margins of which are clamped in the rim of the counterbore 5. Disk 13 is provided with an aperture for the reception of operating pin 11, the wall of the aperture serving as a fulcrum for the operating pin when the handle or knob 12 is pressed.

Figure 5:
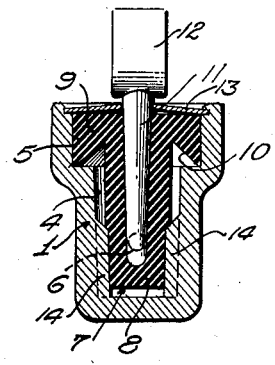
Fig. 5 is an enlarged transverse sectional view, through 5—5 of Fig. 1.
Figure 4:
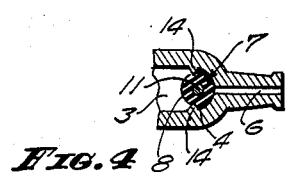
Fig. 4 is a sectional view thereof, through 4—4 of Fig. 3.

It should be noted, with reference to Fig. 5, that the operating pin 11 does not extend entirely through the valve cylinder 8, but terminates a substantial distance from the end thereof, whereby a substantial portion of the valve cylinder is free to bend in any direction.

Formed within the valve bore 4, at diametrically opposite sides thereof, is a pair of longitudinally extending ribs 14 which embed slightly into the sides of the valve cylinder 8.

Figure 2:
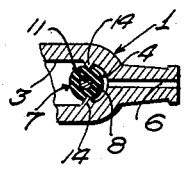
Fig. 2 is a fragmentary sectional view thereof, through 2—2 of Fig. 1.
Figure 3:
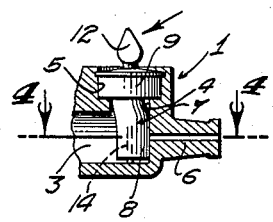
Fig. 3 is a fragmentary partial sectional, partial elevational view of my valve, shown in its closed position.

The operation of my valve as shown in Figs. 1 through 6 is as follows:

The valve cylinder 8 fits loosely within the valve bore 4 so that liquid may flow around the cylinder above the ribs 14 as well as under the cylinder. The ribs 14 press into opposite sides of the valve cylinder and tend to hold the valve cylinder against opposite sides of the valve bore. That is, as shown in Figs. 1 and 2, the ribs tend to hold the valve cylinder at the side of the valve bore intersected by the inlet port 3. Inasmuch as the inlet port is large, this does not close the valve but permits flow from the inlet port around the valve cylinder above the ribs 14 as well as under the cylinder and out the discharge port 6. When the valve cylinder is forced to the opposite side of the valve bore 4, past the ribs 14, the lower or free end thereof first contacting the wall of bore 4 below the discharge port 6, and the valve cylinder then bending or deforming, so that a portion thereof will lie along the wall of the bore and close the discharge port 6, as shown in Fig. 3. The ribs tend to hold the valve cylinder against the wall of the valve bore intersected by the discharge port 6 so as to cover and close the discharge port. Pressure of liquid against the valve cylinder also tends to maintain the valve cylinder in this position.

In order to open the flow through the valve, it is merely necessary to momentarily press forwardly against the handle or knob 12 in the direction of the arrow indicated in Fig. 1. To close the valve, it is merely necessary to press rearwardly on the handle or knob, as shown in Fig. 3, in order to force the valve cylinder 8 between the ribs 14 and against the discharge port 6.

Figure 6:
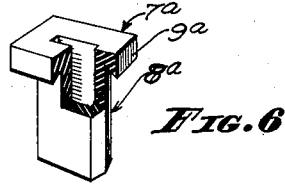
Fig. 6 is a perspective view, partially in section, showing a modified form of the valve element.
Figure 7:
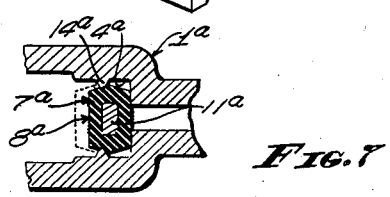
Fig. 7 is a fragmentary sectional view, similar to Fig. 2, showing the modified valve element in a correspondingly modified valve body.

Reference is now directed to Figs. 6 and 7.

In the construction here illustrated, the valve element 7a including the valve cylinder 8a are rectangular in form. The opposite sides of the valve cylinder 8a may have the profile of an obtuse V.

As in the first described structure, the modified valve body 1a is provided with a valve bore 4a having ribs 14a which embed in the sides of the cylinder 8a to hold the cylinder in one extreme position or the other. In operating, a pin 11a is employed as in the first described structure, for moving the valve element 7a between its open and closed positions. As in the first described structure, the valve element 7a is provided with a flanged end 9a. In operation, the construction shown in Figs. 6 and 7 is the same as in the first described structure.

Having fully described my invention, it is to be understood that I do not wish to be limited to the details herein set forth but my invention is of the full scope of the appended claims.

I claim:

1. A valve comprising: a valve body having a valve bore extending therein and provided at one end with a counterbore, an inlet port communicating with said bore, and an outlet port intersecting the side of said bore; an elongated valve element formed of rubber-like material loosely fitting in said valve bore, said valve element, at one end, being provided with an enlarged portion tightly fitting within said counterbore, an apertured rigid member retaining said enlarged portion within said counterbore, the other end of said valve element being free, a pin extending axially within said elongated valve element and terminating a substantial distance from one end thereof, the other end of said pin passing through the apertured retaining member and being provided with a knob thereon, the wall of the aperture forming a fulcrum for said axially extending pin, a pair of axially extending ribs on the wall of said bore, one of said ribs being oppositely disposed relative to the other, said valve element occupying a slightly greater width of said bore than the space between said ribs and adapted to be laterally shifted between said ribs to cover and uncover said outlet port, said outlet port occupying a position in said bore intermediate the free end of said valve element and said fulcrum, whereby, when said knob is moved to close said outlet port, the said valve element tilts and the free end thereof first engages the wall of said bore, and further movement of said knob produces a deformation of said valve element whereby a portion of said valve element will lie along the wall of said bore and close said outlet port, and whereby movement of said knob in another direction will move the valve element to open said outlet port, said ribs being detents that retain said valve element in either its valve opening or valve closing position.

2. A valve as recited in claim 1 in which the elongated valve element is substantially uniform in cross section.

3. A valve as recited in claim 2 in which the elongated valve element is circular in cross section.

4. A valve as recited in claim 2 in which the elongated valve element is generally hexagonal in cross section.

References Cited in the file of this patent
UNITED STATES PATENTS

| | | |
|---|---|---|
| 1,674,250 | Keech | June 19, 1928 |
| 2,313,128 | Densten | Mar. 9, 1943 |
| 2,521,891 | Beams | Sept. 12, 1950 |
| 2,544,498 | Hiertz | Mar. 6, 1951 |
| 2,743,738 | Johnson | May 1, 1956 |
| 2,757,688 | Klingler | Aug. 7, 1956 |